No. 761,260. Patented May 31, 1904.

UNITED STATES PATENT OFFICE.

WILHELM STERNBERG, OF BERLIN, GERMANY, ASSIGNOR TO CHEMISCHE FABRIK AUF ACTIEN, (VORM. E. SCHERING,) OF BERLIN, GERMANY.

COMPOUND OF FORMALDEHYDE.

SPECIFICATION forming part of Letters Patent No. 761,260, dated May 31, 1904.

Application filed October 14, 1902. Serial No. 127,275. (No specimens.)

*To all whom it may concern:*

Be it known that I, WILHELM STERNBERG, chemist, doctor of philosophy, a subject of the Emperor of Germany, residing at Berlin, Kingdom of Prussia, German Empire, have invented a new and useful Improvement in Compounds of Formaldehyde and Tar-Like Products Resulting from the Destructive Distillation of Wood, of which the following is a specification.

The object of this invention is to combine formaldehyde with substances such as oleum rusci, oleum fagi, and the like, which result, in addition to liquid and gaseous products, from the dry or destructive distillation of certain kinds of wood and which are semiliquid substances resembling tar. If formaldehyde be allowed to react upon such tar-like distillation products, preferably in the presence of a condensing agent, such as mineral acids, there result darkly-colored products of condensation, which in a dry state are powdery stable bodies and which give off formaldehyde when heated.

To manufacture the compound of formaldehyde and oleum rusci, one proceeds, for example, in the following manner: To seven hundred grams of oleum rusci are added seven hundred grams of a forty-per-cent. solution of formaldehyde. The mixture is then boiled and the hot liquid brought into 1.5 kilograms of raw hydrochloric acid. When cold, the liquid is poured off from the solidified mass and the latter washed for a long time with water until the water runs off colorlessly and gives no more acid reaction. The product of reaction is a dry brownish powder of a feeble smell which has no more the character of the smell of tar. In consequence of its desiccant and itching-appeasing properties the new substance is very efficacious for the treatment of skin-diseases, especially for the treatment of eczema, in which treatment it is applied externally. The analogous products resulting from oleum fagi and other similar tar-like products of the distillation of wood are manufactured in the same way as indicated above and have the same properties.

It is to be remarked that by the action of formaldehyde upon these tar-like products of distillation not only the phenol-like parts of the same are condensed, but that the whole mass, containing all of the empyreumatic ingredients, is converted into a solid body and rendered available for use. The separated acid solution contains only very insignificant quantities of organic substances.

The compound is insoluble in water, readily soluble in acetone, chloroform, and glacial acetic acid and less readily soluble in alcohol, benzol, methyl alcohol, and caustic alkalies. On heating with acids the compound apparently liberates formaldehyde.

I claim as my invention—

A condensation product which is a brown powder, derived from wood-tar and formic aldehyde, adapted for medicinal use, which is non-poisonous and almost odorless, neither staining nor irritating the skin, insoluble in water, readily soluble in acetone, chloroform and glacial acetic acid, and less readily soluble in alcohol, benzol, methyl alcohol and caustic alkalies.

In testimony whereof I have signed my name to this specification in the presence of two subscribing witnesses.

WILHELM STERNBERG.

Witnesses:
WOLDEMAR HAUPT,
HENRY HASPER.